United States Patent
Tandon et al.

(10) Patent No.: US 10,595,187 B2
(45) Date of Patent: Mar. 17, 2020

(54) SYSTEM AND METHOD OF SELECTIVE PACKET DATA NETWORK GATEWAY DISCOVERY

(71) Applicant: Syniverse Technologies, LLC, Tampa, FL (US)

(72) Inventors: Ravi Tandon, Sandweiler (LU); Huiyue Xu, Tampa, FL (US); David Zhang, Tampa, FL (US); Edward Yau, Tseung Kwan O (HK)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/516,886

(22) Filed: Jul. 19, 2019

(65) Prior Publication Data
US 2020/0029197 A1  Jan. 23, 2020

Related U.S. Application Data

(60) Provisional application No. 62/702,342, filed on Jul. 23, 2018.

(51) Int. Cl.
*H04W 8/00* (2009.01)
*H04W 8/04* (2009.01)
(Continued)

(52) U.S. Cl.
CPC ......... *H04W 8/005* (2013.01); *H04L 61/1511* (2013.01); *H04L 61/3075* (2013.01);
(Continued)

(58) Field of Classification Search
CPC ......... H04W 8/005; H04W 8/04; H04W 8/08; H04W 8/20; H04W 48/17; H04W 36/12;
(Continued)

(56) References Cited

U.S. PATENT DOCUMENTS

| 2011/0142015 A1* | 6/2011 | Shaikh | H04L 29/12641 370/338 |
| 2015/0223133 A1* | 8/2015 | Stojanovski | H04L 9/14 370/230 |
| 2019/0223013 A1* | 7/2019 | Yu | H04W 8/04 |

FOREIGN PATENT DOCUMENTS

WO   WO-2018034924 A1 *  2/2018  ............ H04W 48/18

* cited by examiner

*Primary Examiner* — Curtis A Alia
(74) *Attorney, Agent, or Firm* — Andriy Lytvyn; Smith & Hopen, P.A.

(57) ABSTRACT

A Slicing Agent node is deployed between standard Home Subscriber Server (HSS) node and a Serving General Packet Radio Service Support Node (SGSN) node, a Mobility Management Entity (MME) node, or a $3^{rd}$ Generation Partnership Project Authentication Authorization and Accounting (3GPP AAA) node on S6a/S6d/SWx interfaces of a Core Network. The Slicing Agent node selects the Packet Data Gateway (PGW) and communicates the identifying information of the selected PGW to SGSN/MME/3GPP AAA nodes. The PGW is selected to serve subscriber sessions based on the subscriber's profile, usage, and business needs. The Slicing Agent node can be positioned in any Core Network setup around the globe irrespective of whether it is a roaming or a non-roaming scenario for subscribers/devices having global or country-specific Subscriber Identity Modules (SIMs), without requiring any enhancements or upgrades in legacy or existing network nodes including SGSN, MME, 3GPP AAA and HSS.

20 Claims, 4 Drawing Sheets

(51) Int. Cl.
  *H04W 8/08*   (2009.01)
  *H04W 8/20*   (2009.01)
  *H04L 29/06*  (2006.01)
  *H04L 29/12*  (2006.01)
  *H04W 48/00*  (2009.01)

(52) U.S. Cl.
  CPC ...... *H04L 61/6054* (2013.01); *H04L 63/0892* (2013.01); *H04W 8/04* (2013.01); *H04W 8/08* (2013.01); *H04W 8/20* (2013.01); *H04W 48/17* (2013.01)

(58) Field of Classification Search
  CPC ............. H04L 61/3075; H04L 63/0892; H04L 61/1511; H04L 61/6054
  See application file for complete search history.

SYSTEM AND METHOD OF SELECTIVE PACKET DATA NETWORK GATEWAY DISCOVERY

PRIORITY CLAIM

This non-provisional application claims priority to U.S. Provisional Application No. 62/702,342 filed Jul. 23, 2018, which is incorporated herein by reference.

BACKGROUND OF THE INVENTION

1. Field of the Invention

This invention relates generally to the field of telecommunications and, more particularly, a system and method of Packet Data Network Gateway discovery and selection based on pre-defined criteria associated with the User Equipment.

2. Brief Description of the Related Art

Currently, cellular telecommunications core networks have a "one-size-fits-all" approach, in which a single Packet Data Network (PDN) serves all types of devices and provides the same service features regardless of the type of service being used by the device/subscriber. This approach is inflexible and inefficient. It is also not sufficiently dynamic to meet the rapidly increasing network usage needs. Thus, what is needed is a system and a method of dynamic PDN Gateway (GW) discovery that can intelligently select the best suited PGW based on service type, location, and user profile, thereby maximizing flexibility and enabling the network provider to meet all service needs with no changes in standard functionality of existing core nodes.

SUMMARY OF THE INVENTION

In an embodiment, the invention is a method of discovering a Packet Distribution Network Gateway (PGW). A Slicing Agent node is deployed between a Home Subscriber Server (HSS) node and a Serving General Packet Radio Service Support Node (SGSN) node, a Mobility Management Entity (MME) node, or a 3$^{rd}$ Generation Partnership Project Authentication, Authorization and Accounting (3GPP AAA) node. When the Slicing Agent node receives an Update Location Request or a Non-3GPP IP Access Registration Request, the Slicing Agent node identifies a current location of a User Equipment (UE) and a service type. Based on this information, the Slicing Agent node selects a PGW that is proximal to the current location of the UE and that is configured to provide the required service type. In an embodiment, the service type of the UE is preconfigured in the Slicing Agent based on an International Mobile Subscriber Identity (IMSI) value allocated to the Subscriber Identity Module (SIM). After selecting the appropriate PGW, the Slicing Agent node replies to the Update Location Request or the Non-3GPP IP Access Registration Request with identifying information of the selected PGW.

A Local DNS server is queried for an Internet Protocol (IP) Address of the PGW based on the identifying information thereof. This querying step can be performed by a Trusted Wi-Fi Access Gateway (TWAG) node, an Evolved Packet Data Gateway (ePDG) node, the SGSN node, or the MME node, depending on the network type and architecture. The query returns the IP Address of the PGW. Once the IP Address of the PGW is known, a Create PDP Context Request or Create Session Request is forwarded to the IP Address of the PGW to establish a data session for the UE (the Create PDP Context Request would be sent by SGSN, while the Create Session Request would be sent by MME, TWAG, ePDG, or a Serving Gateway (SGW) nodes).

The UE can have a global or a country-specific SIM. The UE can be selected from a wide array of connected devices including an Internet of Things (IoT) device, a connected vehicle, a connected wearable device, a mobile phone, and a connected computing device. Examples of the service types corresponding to the UE include an IoT service, a mobile broadband service, and a connected vehicle service.

In an embodiment, if the UE has a global International Mobile Subscriber Identity (IMSI), the PGW is discovered based on the service type for the data session creation when the UE is roaming in a non-local region.

In an embodiment, the service type that the Slicing Agent node associates with an IMSI value can be modified or reconfigured based on a use case. The service type associated with a particular IMSI can be changed within the Slicing Agent node itself without changing the IMSI or the SIM. Another method for changing the service type that the Slicing Agent node associates with the UE without changing the SIM is to assign a new IMSI value to the existing SIM, wherein the new IMSI value corresponds to a different set of service type. The IMSI can be changed via an Over-The-Air (OTA) procedure.

In an embodiment, discovery of the PGW is performed via non-3GPP access over S2a and S2b interfaces.

The data session can be established for a default APN or a non-default APN.

In an embodiment, the identifying information of the PGW is selected from the group consisting of Access Point Name Operator Identification (APN-OI), Full Qualified Domain Name (FQDN), and a combination thereof.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Figure 1:
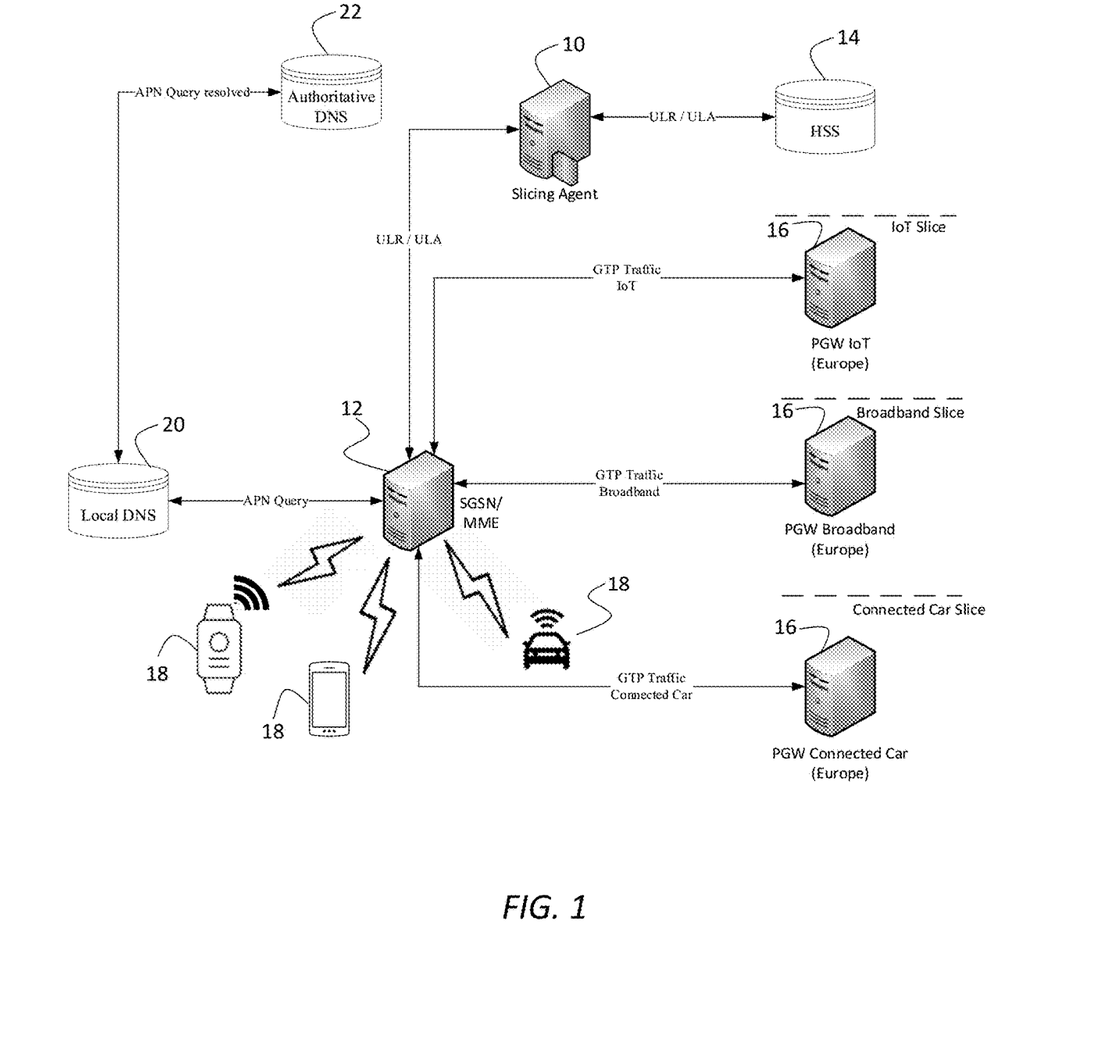
FIG. 1 is a diagram schematically depicting an embodiment of the invention in which the PGW discovery is based on current location and service/slice type.

An embodiment of the invention is schematically depicted in FIG. 1. The invention introduces a new network node, which the inventors named the Slicing Agent. FIG. 1 depicts an embodiment pertaining to Long Term Evolution (LTE) network. In this embodiment, Slicing Agent node 10 is positioned between standard Serving GPRS Support Node (SGSN)/Mobility Management Entity (MME) node 12 and Home Subscriber Server (HSS) node 14 on S6a/S6d interface of a Core Network. The Slicing Agent node can also be positioned between SGSN and Home Location Register (HLR) nodes on Gr interface. Slicing Agent node 10 can be deployed in an existing LTE wireless Core Network without requiring any enhancement or modification of the legacy or existing nodes including SGSN, MME, 3GPP-AAA and HSS nodes.

In prior art systems, SGSN/MME is configured to discover a Packet Data Network Gateway (PGW) by directly obtaining its Internet Protocol (IP) address of Fully Qualified Doman Name (FQDN) from HSS or by resolving the Access Point Name (APN) value received from a User Equipment (UE). A major flaw of the prior art systems is that the PGW selection is not service-type or location specific, which renders the PGW selection process inflexible, inefficient, and not dynamic.

In contradistinction, FIG. 1 depicts Slicing Agent node 10 being deployed between SGSN/MME 12 and HSS 14. Slicing Agent node 10 is configured to determine an appropriately-suited PGW 16 to service UE 18 based on the service type, business needs and the location of the subscriber. Deployment of Slicing Agent node 10 constitutes a departure from the prior art systems and enables dynamic PGW discovery based on service type, location, user profile, and other parameters.

Slicing Agent node 10 assists SGSN/MME 12 in selecting an appropriate PGW 16 positioned on a particular "Network Slice." PGW 16 is selected based on its ability to serve a subscriber session based on user profile, usage, and business needs. Slicing Agent node 10 can be deployed in any Core Network setup around the globe, irrespective of whether the telecommunication services are being provided in a roaming or non-roaming scenario for subscribers/devices having global and country specific SIMs.

The following disclosure provides four exemplary scenarios of PGW 16 discovery, however, it should be noted that the scope of the invention is not limited to these four scenarios, and encompasses other PGW discover criteria based on subscriber experience and business needs.

(1) based on the current location and service type;
(2) based on the current location and service type for non-3GPP access;
(3) based on respective regions for a Global IMSI with default APN; and
(4) based on respective regions for a Global IMSI with non-default APN.

Each of these four scenarios is discussed in more detail below.

Referring to FIG. 1, UE 18 can be any device within a wide array of network devices including an Internet of Things (IoT) device, a connected vehicle, a smartphone or any other type of a network device. When UE 18 attempts to attach to SGSN/MME 12 with a default or non-default Access Point Name (APN), SGSN/MME 12 sends an Update Location Request (ULR) message toward HSS 14 to update its location and obtain the subscriber profile, to which HSS 14 replies with an Update Location Answer (ULA) message having a subscriber profile corresponding to an International Mobile Subscriber Identity (IMSI) of UE 18. As discussed above, Slicing Agent node 10 is deployed between SGSN/MME 12 and HSS 14 and is configured to access the ULR and/or ULA messages. In an embodiment, Slicing Agent node 10, in collaboration with HSS 14, validates the IMSI of UE 18 and updates the original subscriber profile returned by HSS 14 before replying back to SGSN/MME 12, to redirect the session towards most appropriate instance of PGW 16.

To select the most appropriate instance of PGW 16, Slicing Agent node 10 checks the current location of the IMSI and the service type that Slicing Agent node 10 is configured to associate with the IMSI value. Examples of service types include IoT, Mobile Broadband, Connected Vehicle, etc. The service type of UE 18 is preconfigured in Slicing Agent node 10 based on the IMSI value allocated to the SIM. Based on this information, Slicing Agent node 10 determines which PGW 16 is positioned in the appropriate location and configured for the type of service associated with UE 18 based on its IMSI value. The service type that Slicing Agent node 10 is preconfigured to associate with an IMSI can be readily modified or reconfigured using various methods. For example, the service type associated with a particular IMSI can be changed within Slicing Agent node 10 itself without changing the IMSI or the SIM. Another method for changing the service type associated with UE 18 without changing the SIM is to assign a new IMSI value to the existing SIM, wherein the new IMSI value corresponds to a different set of service type. The IMSI can be changed via an Over-The-Air (OTA) procedure.

After Slicing Agent node 10 has selected PGW 16, Slicing Agent node 10 replies to SGSN/MME 12 with the APN Operator Identity (APN-OI) of the selected PGW 16, which provides the required service type and is located in a close proximity to geographic location of UE 18. In the example of FIG. 1, if UE 18 has a global IMSI of an IoT device belonging to North America region but roaming in Europe, UE 18 can be more efficiently serviced locally in Europe by PGW 16 which is specifically sliced for IoT devices. Thus, Slicing Agent node 10 will identify PGW 16 that belongs to an IoT "slice"—i.e., is configured to provide IoT services—and is located in Europe. PGW 16 will then communicate APN-OI of such PGW 16 to SGSN/MME 12.

Upon receiving the APN-OI for the selected PGW 16, SGSN/MME 12 derives FQDN of the selected PGW 16 and queries respective Local DNS servers 20 with APN-FQDN. Local DNS servers 20 communicate with Authoritative DNS servers 22, if needed, to resolve APN-FQDN query to obtain the exact IP Address of the selected PGW 16. As a result of the query, SGSN/MME 12 obtains the IP Address of the selected PGW 16. Once the SGSN/MME 12 obtains the IP Address of the selected PGW 16, SGSN/MME 12 is configured to forward the Create PDP Context Request/Create Session Request to the selected PGW 16 to establish a data session. In this manner, global IMSIs perform local PGW 16 discovery based on service/slice type for data session creation when they are roaming in non-local regions.

Figure 2:
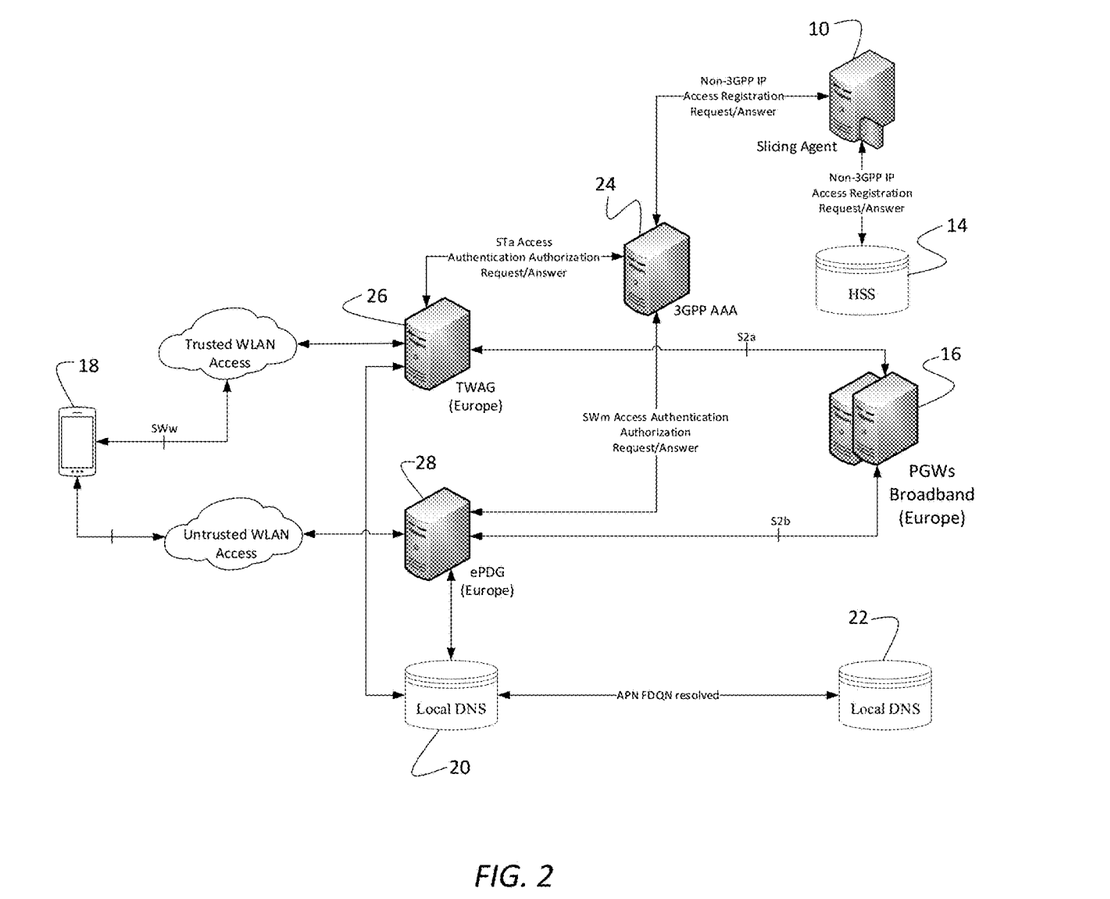
FIG. 2 is a diagram schematically depicting an embodiment of the invention in which the PGW discovery is based on current location and service/slice type for non-3GPP access.

An embodiment depicted in FIG. 2 pertains to Non-3GPP Access networks. In this embodiment, Slicing Agent node 10 is deployed between $3^{rd}$ Generation Partnership Project Authentication, Authorization and Accounting (3GPP AAA) node 24 and HSS 14 on SWx interfaces of a Core Network. Slicing Agent node 10 can also be positioned between SGSN and Home Location Register (HLR) nodes on Gr interface.

FIG. 2 schematically depicts an architecture of an embodiment of the invention in which discovery of an appropriate PGW 16 is based on a current location and service type for Non-3GPP Access. In this embodiment, when UE 18 attaches via a Non-3GPP Access network (Trusted or Non-Trusted Access), the Trusted Wireless Access Gateway (TWAG) node 26 or Evolved Packet Data Gateway (ePDG) node 28 authenticates UE 18 and obtains subscriber profile via 3GPP AAA server 24. The 3GPP AAA server 24 communicates with HSS 14 via Slicing Agent 10 to obtain the subscriber profile for UE 18.

FIG. 2 depicts that Slicing Agent node 10 is positioned between the 3GPP AAA server 24 and the HSS 14. Upon receipt of Non-3GPP IP Access Registration Request (ARR) message, Slicing Agent node 10, in collaboration with HSS 14, validates the IMSI of UE 18. In addition to UE 18 validation, Slicing Agent node 10 also checks the current location and service associated with the IMSI value of the UE 18. Based on this information, Slicing Agent node 10 selects an appropriate PGW 16 that is nearest to the location of UE 18 and provides the specific service corresponding to the IMSI value of UE 18. For example, if a subscriber with global IMSI belonging to North America region roams in Europe, greater efficiency will be achieved if the subscriber is serviced locally in Europe because both latency and cost will be reduced and sufficient bandwidth to support broadband services will be provided. The service type of the UE is preconfigured in the Slicing Agent node 10 based on the IMSI value allocated to the SIM.

After the appropriate PGW 16 has been selected, Slicing Agent node 10 updates the original subscriber profile returned by HSS 14 to redirect the UE session towards most appropriate instance of PGW 16. Slicing Agent node 10 replies to the ARR message with APN-OI of the selected PGW 16. Upon receiving the APN-OI for the selected PGW 16, 3GPP AAA server 24 communicates this information to TWAG 26 or ePDG 28. Next, TWAG 26 or ePDG 28 queries the respective Local DNS servers 20 with APN-FQDN of the selected PGW 16 to obtain its exact IP Address. Once the IP Address is known, TWAG 26 or ePDG 28 forwards a Create Session Request to the IP Address of the selected PGW 16 to establish a data session. In this manner, specific devices perform local and slice-specific PGW discovery for data session creation via Non-3GPP access over S2a and S2b interfaces.

Figure 3:
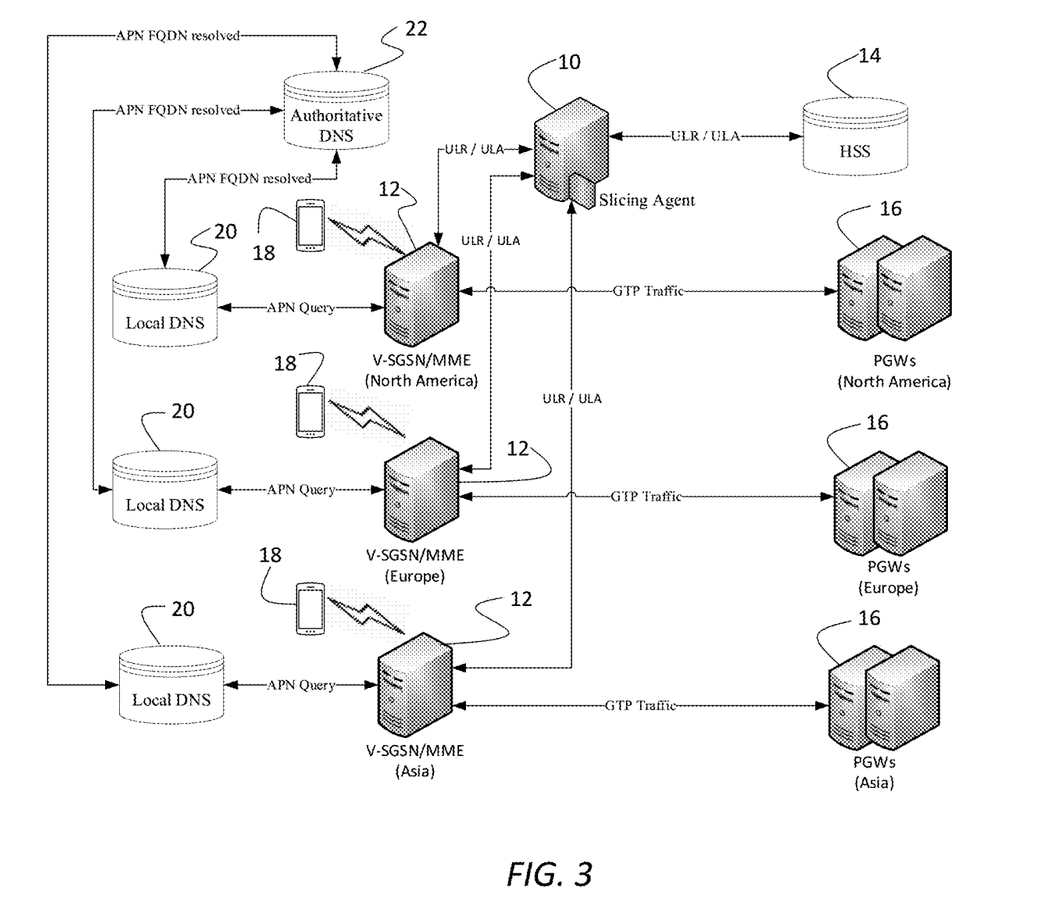
FIG. 3 is a diagram schematically depicting an embodiment of the invention involving the PGW discovery with a default APN or a non-default APN.

FIG. 3 schematically depicts an embodiment involving PGW discovery with a default APN. When UE 18 attempts to attach to SGSN/MME 12 having a default APN, SGSN/MME 12 sends Update Location Request message toward HSS 14 to update the location of UE 18 and obtain the subscriber profile. In this embodiment, Slicing Agent node 10 is positioned between SGSN/MME 12 and the HSS 14. Upon receiving Update Location Request, Slicing Agent node 10 validates UE 18 and checks the Regional IMSI range (in case of Global IMSI) or a Location (in case of normal IMSI). Slicing Agent node 10 replies to the Update Location Request message with the corresponding APN-OI for a selected regional PGW 16 available to provide services to UE 18. Thus, there can be multiple criteria defined in Slicing Agent node 10 that can aid SGSN/MME 12 to perform the final selection of PGW 16.

Upon receiving APN-OI for the selected PGW 16, SGSN/MME 12 queries the respective Local DNS servers 20 with APN-FQDN. As a result of the query, SGSN/MME 12 obtains the IP Address of the selected PGW 16. At this point, SGSN/MME 12 forwards the Create PDP Context Request/Create Session Request to establish the data session. In this manner, regional discovery of PGW 16 for data session can be achieved for default APNs.

In an embodiment depicted in FIG. 3, discovery of PGW 16 can be performed for SGSN/MME 12 with a non-default APN. When UE 18 attempts to attach to SGSN/MME 12 with non-default APN (for example, globroam), SGSN/MME 12 sends an Update Location Request message towards HSS 14 to update location of UE 18 and obtain the subscriber profile. Analogously to the embodiment of FIG. 3, Slicing Agent node 10 is deployed between visited SGSN/MME 12 and HSS 14. Upon receiving the Update Location Request, the Slicing Agent node 10 in collaboration with HSS 14 validates the subscriber but also checks the Regional IMSI range (in case of Global IMSI) or Location (in case of normal IMSI). Slicing Agent node 10 selects the appropriate PGW 16 for servicing UE 18. Slicing Agent node 10 replies back to SGSN/MME 12 with APN-OI for the selected PGW 16 available to provide services to the subscriber/device using the non-default APN. Slicing Agent node 10 can perform final PGW 16 selection based on predefined criteria.

After HSS 14 and Slicing Agent node 10 establish the region in which the subscriber is located, Slicing Agent node 10 provides APN-OI for the respective regional PGW 16 in the Update Location Answer message, along with complete subscriber profile also containing the non-default APN profile. Next, SGSN/MME 12 queries the respective Local DNS servers with non-default FQDN details received from Slicing Agent node 10. As a result, SGSN/MME 12 obtains the IP Address of the selected PGW 16. SGSN/MME 12 forwards the Create PDP Context Request/Create Session Request to the selected PGW 16 to establish the data session. In this manner, regional discovery of PGW 16 for data session can be achieved for non-default APNs.

Figure 4:
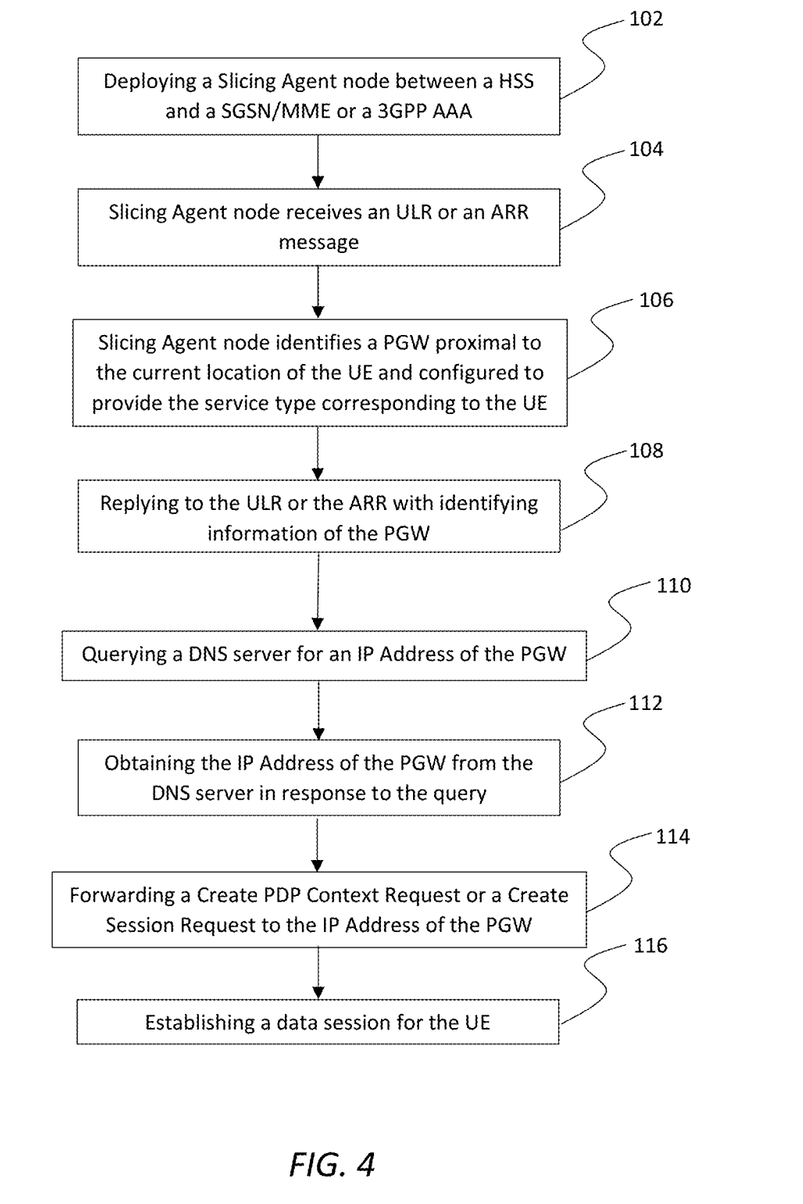
FIG. 4 is a flowchart illustrating the steps of the PGW discovery according to an embodiment of the invention.

FIG. 4 provides a flowchart for discovering an appropriate PGW 16 to service UE 18. In step 102, Slicing Agent node 10 is provided between HSS 14 and SGSN/MME 12 or 3GPP AAA 24. In step 104, Slicing Agent node 10 receives an ULR or an ARR message from SGSN/MME 12 or 3GPP AAA 24. Based on the information contained in the ULR or the ARR message, Slicing Agent node 10 identifies a current location of the UE and a type of service associated with UE 18 based on its IMSI value. In step 106, Slicing Agent 10 identifies PGW 16 that is proximal to the current location of UE 18 and is configured to provide the required service type. In step 108, Slicing Agent node 10 replies to the ULR or the ARR message with identifying information of PGW 16. In an embodiment, the identifying information is APN-OI. The APN-OI can be used to determine the FQDN of the selected PGW. In step 110, SGSN/MME 12 or 3GPP AAA 24 queries a DNS Server with the FQDN to ascertain the exact IP Address of PGW 16. In step 112, SGSN/MME 12 or 3GPP AAA 24 receives the IP Address of PGW 16 in response to the query. In step 114, SGSN/MME 12 or 3GPP AAA 24 forwards a Create PDP Context Request/Create Session Request to the IP Address of PGW 16. In step 116, a data session for UE 18 is established.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms $3^{rd}$ Generation Partnership Project Authentication, Authorization and Accounting (3GPP AAA) is a network node implemented to securely determine the identity and privileges of a user and to track that user's activities, particularly with respect to billing.

Access Point Naming (APN) is the assigning of identifying names (universal resource locators-URLs) to access points that allow names to identify node IP addresses within GSM and GPRS networks. An APN is composed of two parts: a network ID and an operator specific ID. The network ID identifies the service requested by a user in a network and the operator ID identifies the specific routing information.

Evolved Packet Data Gateway (ePDG) is a network node that provides access to packet switched (PS) domain services to a UE. ePDG handles IP address management, support for Mobile IP, quality of service (QoS) enforcement, lawful intercept, and security.

Home Subscriber Server (HSS) is a server that can store and process subscription data and other information about each subscriber authorized to use the network.

International Mobile Subscriber Identity (IMSI) is a number assigned by a mobile system operator to uniquely identify a UE.

Mobility Management Entity (MME) is a network node responsible for mobility and session management procedures in and Evolved Packet Core network.

Packet Data Network Gateway (PGW) is a device or assembly that coordinates the control and adapts packet data transmission between a communication connection and another system. A packet data network gateway may adapt data formats and communication processes to the system with which it is communicating.

Slicing Agent node is a new network node disclosed herein that is used for discovery of PGW based on location, requested APN and preconfigured service type.

Serving GPRS Support Node (SGSN) is a component of the GPRS network. SGSN handles packet switched data within the network, e.g. the mobility management and authentication of the users.

Trusted Wi-Fi Access Gateway (TWAG) enables UEs to connect to a PGW via a trusted Wi-Fi network. TWAG assures network security when no direct connectivity is in place between the Trusted Wi-Fi router and the PGW.

User Equipment (UE) is a device that can connect to a communication system. Examples of UE devices include mobile telephones, personal computers, IoT devices, wearable connected devices, connected vehicles, transceivers that are installed in vehicles or fixed wireless units.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of discovering a Packet Distribution Network Gateway (PGW), comprising:
    deploying a Slicing Agent node between a Home Subscriber Server (HSS) node and a node selected from the group consisting of a Serving General Packet Radio Service Support Node (SGSN) node, a Mobility Management Entity (MME) node, and a 3rd Generation Partnership Project Authentication, Authorization and Accounting (3GPP AAA) node;
    receiving, by the Slicing Agent node, an Update Location Request message or an Access Registration Request;
    identifying, by the Slicing Agent node, a current location of a User Equipment (UE) and a service type;
    identifying, by the Slicing Agent node, the PGW proximal to the current location of the UE and configured to provide the service type;
    replying, by the Slicing Agent node, to the Update Location Request or the Access Registration Request with identifying information of the PGW;
    responsive to receiving the identifying information of the PGW, querying, by the SGSN, the MME, or the 3GPP AAA, a DNS server for an Internet Protocol (IP) Address of the PGW;

obtaining, by the SGSN, the MME, or the 3GPP AAA, the IP Address of the PGW from the DNS server in response to the query;

forwarding, by the SGSN, the MME, or the 3GPP AAA, a Create Packet Data Protocol (PDP) Context Request or Create Session Request to the IP Address of the PGW; and establishing, by the PGW, a data session for the UE.

2. The method of claim 1, wherein the UE has a global or a country-specific Subscriber Identity Module (SIM).

3. The method of claim 2, wherein the Slicing Agent node is preconfigured to associate the service type with an International Mobile Subscriber Identity (IMSI) value allocated to the SIM.

4. The method of claim 3, wherein the service type associated with the IMSI value is reconfigurable.

5. The method of claim 1, wherein the SGSN/MME, the HSS, and the 3GPP AAA nodes are existing core network nodes and the Slicing Agent node is configured to be deployed without modifying, replacing or upgrading the existing core network nodes.

6. The method of claim 1, wherein the UE is selected from the group consisting of an Internet of Things (IoT) device, a connected vehicle, a connected wearable device, a mobile phone, and a connected computing device.

7. The method of claim 1, wherein the service type is selected from the group consisting of an IoT service, a mobile broadband service, and a connected vehicle service.

8. The method of claim 1, wherein for the UE having a global International Mobile Subscriber Identity (IMSI), discovery of the PGW is based on the service type for the data session creation when the UE is roaming in a non-local region.

9. The method of claim 1, wherein the querying step is performed by a Trusted Wi-Fi Access Gateway (TWAG) node, an Evolved Packet Data Gateway (ePDG) node, the SGSN, or the MME.

10. The method of claim 1, wherein the data session is established for a default APN or a non-default APN.

11. The method of claim 1, wherein the identifying information of the PGW is selected from the group consisting of Access Point Name Operator Identification (APN-OI), Full Qualified Domain Name (FQDN), and a combination thereof.

12. A Slicing Agent node deployed in a telecommunications network between a Home Subscriber Server (HSS) node and a node selected from the group consisting of a Serving General Packet Radio Service Support Node (SGSN) node, a Mobility Management Entity (MME) node, and a 3rd Generation Partnership Project Authentication, Authorization and Accounting (3GPP AAA) node, wherein the Slicing Agent node is a network node implemented in a hardware, a firmware, or a software compromising a set of machine-readable instructions stored on a non-transitory machine-readable, medium, the Slicing Agent node configured to select a Packet Distribution Network Gateway (PGW) for servicing a User Equipment (UE) by executing instructions comprising:

receiving an Update Location Request from the SGSN node or the MME node or receiving an Access Registration Request from the 3GPP AAA node;

identifying a current location of the UE and a service type thereof;

identifying the PGW proximal to the current location of the UE and configured to provide the service type;

replying to the Update Location Request or the Access Registration Request with identifying information of the PGW;

wherein, the identifying information of the PGW in used to query a DNS server to obtain an Internet Protocol (IP) Address, whereby a Create Session Request is forwarded to the IP Address of the PGW to establish a data session for the UE.

13. The Slicing Agent node of claim 12, wherein the UE has a global or a country-specific Subscriber Identity Module (SIM).

14. The Slicing Agent node of claim 13, wherein the Slicing Agent node is preconfigured to associate the service type with an International Mobile Subscriber Identity (IMSI) value allocated to the SIM.

15. The Slicing Agent node of claim 14, wherein the service type associated with the IMSI value is reconfigurable.

16. The Slicing Agent node of claim 12, wherein the SGSN/MME, the HSS, and the 3GPP AAA nodes are existing core network nodes and the Slicing Agent node is configured to be deployed without modifying, replacing, or upgrading the existing core network nodes.

17. The Slicing Agent node of claim 12, wherein for the UE having a global International Mobile Subscriber Identity (IMSI), discovery of the PGW is based on the service type for the data session creation when the UE is roaming in a non-local region.

18. The Slicing Agent node of claim 12, wherein querying the DNS server for the IP Address of the PGW is performed by a Trusted Wi-Fi Access Gateway (TWAG) node, an Evolved Packet Data Gateway (ePDG) node, the SGSN, or the MME.

19. The Slicing Agent node of claim 12, wherein the data session is established for a default APN or a non-default APN.

20. The Slicing Agent node of claim 12, wherein the identifying information of the PGW is selected from the group consisting of Access Point Name Operator Identification (APN-OI), Full Qualified Domain Name (FQDN), and a combination thereof.

* * * * *